US012171195B2

(12) United States Patent
Eynard et al.

(10) Patent No.: US 12,171,195 B2
(45) Date of Patent: Dec. 24, 2024

(54) DEVICE AND PROCESS FOR PUTTING A JACKET ON A MAMMAL (71) Applicant: ETISENSE, Lyons (FR)

(72) Inventors: Charles Eynard, Lyons (FR); Timothé Flenet, Lyons (FR)

(73) Assignee: ETISENSE, Lyons (FR)

( * ) Notice: Subject to any disclaimer, the term of this patent is extended or adjusted under 35 U.S.C. 154(b) by 47 days.

(21) Appl. No.: 17/837,717

(22) Filed: Jun. 10, 2022

(65) Prior Publication Data
US 2023/0397576 A1 Dec. 14, 2023

(51) Int. Cl.
A01K 13/00 (2006.01)
A01K 29/00 (2006.01)

(52) U.S. Cl.
CPC ............ *A01K 29/00* (2013.01); *A01K 13/006* (2013.01)

(58) Field of Classification Search
CPC .............................. A01K 29/00; A01K 13/006
See application file for complete search history.

(56) References Cited

U.S. PATENT DOCUMENTS

| 3,739,751 | A | * | 6/1973 | Mohr | ....................... | A61D 3/00 |
| | | | | | | 119/752 |
| 5,320,069 | A | * | 6/1994 | Anderson, Jr. | ...... | A01K 1/0613 |
| | | | | | | 119/757 |
| 5,839,393 | A | * | 11/1998 | Rupp | ................... | A01K 13/006 |
| | | | | | | 119/712 |
| 6,446,579 | B1 | * | 9/2002 | Griebling | ............. | A01K 1/0613 |
| | | | | | | 119/751 |
| 7,699,195 | B2 | * | 4/2010 | Scott | ..................... | A47G 25/907 |
| | | | | | | 223/111 |
| 7,762,953 | B2 | | 7/2010 | Derchak et al. | | |
| D641,526 | S | * | 7/2011 | Brown | ......................... | D30/151 |
| 8,590,487 | B1 | * | 11/2013 | Goddard, Jr. | .......... | A61B 6/527 |
| | | | | | | 119/751 |
| 2014/0196670 | A1 | * | 7/2014 | Lamers | ................ | A01K 13/004 |
| | | | | | | 119/621 |
| 2020/0128811 | A1 | * | 4/2020 | Evans | ................... | A01M 23/16 |
| 2022/0175266 | A1 | | 6/2022 | Eynard et al. | | |

FOREIGN PATENT DOCUMENTS

FR        3094628 A1    10/2020
WO     WO-9912413 A1 *  3/1999    ........... A01K 1/0613

* cited by examiner

*Primary Examiner* — Monica L Perry
*Assistant Examiner* — Edgar Reyes
(74) *Attorney, Agent, or Firm* — Thomas | Horstemeyer, LLP (57) ABSTRACT A device for putting a jacket on a mammal, comprising: a tube extending along an axis between an inlet and an outlet; the tube comprising: a hollow conical part tapering from the inlet and a hollow cylindrical part contiguous to the conical part and leading to the outlet, the cylindrical part having an outer surface adapted to receive the jacket, the tube presenting a slit running longitudinally through the tube; and a base comprising a flat support surface parallel to the axis of the tube, the tube being configured to allow passage of the mammal through the tube from the inlet to the outlet so that the mammal engages the jacket when exiting from the tube.

11 Claims, 7 Drawing Sheets

DEVICE AND PROCESS FOR PUTTING A JACKET ON A MAMMAL

FIELD OF THE INVENTION

The invention relates to a device for putting a jacket on a mammal with minimal constraint, without hurting or restraining it.

TECHNICAL BACKGROUND

Inductive plethysmography is a tool for measuring variations in volume of the trunk of a mammal (human or animal), for respiratory and/or cardiac applications.

The principle of this measurement is to wind around the trunk of the subject at least one inductive winding formed of one or more strands of electrically conductive wire. A variation in volume of the trunk, due notably to respiratory and/or cardiac activity, leads to a variation in inductance of each winding, which is measured by a sensor.

The reliability of the measurements necessitates ensuring that the position of the winding(s) with respect to the subject is constant over time. In particular, it is necessary to avoid any sliding of each winding vis-à-vis the trunk of the subject. Furthermore, in the case of a plurality of successive recordings, it is necessary to position each winding at the same spot on the trunk of the subject to ensure reproducibility of the measurements.

For human beings, it is known to sew each winding onto a band of an elastic textile and to wind said band around the trunk of the subject. In an alternative manner, each winding or band may be sewn onto a garment, such as a T-shirt, configured to be slipped onto the trunk of the subject with a slight tightening.

For animals of medium size (such as dogs, primates, pigs), it is also known to use such bands, which are maintained on the animal by being integrated in a garment by push studs. The document U.S. Pat. No. 7,762,953 describes such a device.

For small laboratory mammals, a jacket has been developed and described in document FR3094628A1. "Small mammal" is taken to mean in the present text the mammals normally used in laboratories and of which the mass is less than 3 kg. These mammals comprise in particular rodents (mice, rats, guinea pigs, hamsters, gerbils, ferrets) and lagomorphs (rabbits).

However, such a jacket requires restraining and/or anesthetizing the small mammal for putting the jacket, which takes time and may generate stress or discomfort for the animal.

SUMMARY OF THE DISCLOSURE

An aim of the invention is to help putting a jacket on a small mammal with a minimal constraint while handling it.

To this end it is proposed to create a device to encourage the mammal to pass through the device and engage the jacket when exiting from the device. Said device includes:
a tube extending along an axis between an inlet and an outlet, the tube comprising:
a hollow conical part tapering from the inlet and
a hollow cylindrical part contiguous to the conical part and leading to the outlet, the cylindrical part having an outer surface adapted to receive the jacket,
the tube presenting a slit running longitudinally through the tube; and
a base comprising a flat support surface parallel to the axis of the tube,
the tube being configured to allow passage of the mammal through the tube from the inlet to the outlet so that the mammal engages the jacket when exiting from the tube.

Moreover, the invention proposes a method using this device to put the jacket easily on the mammal without involving any restraint operation nor any anesthesia of the animal.

Said method allows inciting the mammal to enter the tube that tapers until it fits the diameter of the jacket to be put on to the mammal.

The invention is advantageously completed by the following features, taken alone or in any technically possible combination thereof:
the slit is located opposite the base in relation to the axis of the tube and runs along the tube from the inlet to the outlet;
the base is connected to the conical part, from the inlet to a junction between conical part and cylindrical part;
an end of the conical part defines the inlet extends in a plane perpendicular to the axis of the tube;
the device is in plastic material;
the device is in red color.

The invention further provides a kit comprising a device as described above and a jacket for a mammal of which the mass is less than 3 kg, the jacket being positioned around the cylindrical part of the device.

According to some embodiments, the length of the jacket inserted on the cylindrical part of the tube is between 20% and 50% of a total length of the jacket.

According to some embodiments, the jacket comprises a tube made of elastic textile configured to surround the trunk of said mammal and at least one inductive winding formed of a strand of electrically conductive wire arranged in the form of wavelets along the circumference of said tube.

According to some embodiment, the jacket comprises two orifices suitable for the passage of the front paws of the mammal.

According to one embodiment, a method for putting a jacket on a mammal using such a device, comprises:
putting the jacket around the cylindrical part and until the junction between conical and cylindrical parts;
placing the base of the device on a support surface;
causing the mammal to enter into the conical part through the inlet of the tube;
letting the mammal pass along the tube and exit through the outlet of the tube, thereby engaging the jacket.

According to some embodiments, the method comprises positioning the device vertically, the axis of the tube being then perpendicular to the support surface for putting the jacket on the cylindrical part.

According to one embodiment, the method comprises inserting the animal's paws into holes provided in the jacket.

BRIEF DESCRIPTION OF THE FIGURES

Other characteristics and advantages of the invention will become clear from the detailed description that follows, with reference to the appended drawings in which.

DETAILED DESCRIPTION OF EMBODIMENTS

Jacket

An inductive plethysmography jacket for a small mammal comprises a tube made of elastic textile configured to surround the trunk of said mammal. The tube comprises a longitudinal axis which is substantially parallel to the spinal column of the animal.

The tube may have a longitudinal closing, for example arranged along the spinal column of the animal, in order to facilitate the putting in place of the tube on the trunk. Such a closing may comprise fastening elements of hook and loop type (better known by the name VELCRO™), push studs, a slide fastener, etc.

Alternatively, the tube may be closed on itself in a permanent manner, by welding, bonding or sewing for example; it must then be slipped onto the trunk of the animal, the elasticity of the textile being chosen to enable such a slipping on with adjustment to the trunk of the animal.

The tube serves as support for at least one inductive winding formed of a strand of electrically conductive wire arranged in the form of wavelets along the circumference of said tube. To this end, the jacket may comprise at least one strip made of elastic textile arranged on the circumference of the tube and defining a plurality of longitudinal loops, each wavelet being formed by the passage of the strand of conductive wire successively in each loop.

Figure 1:
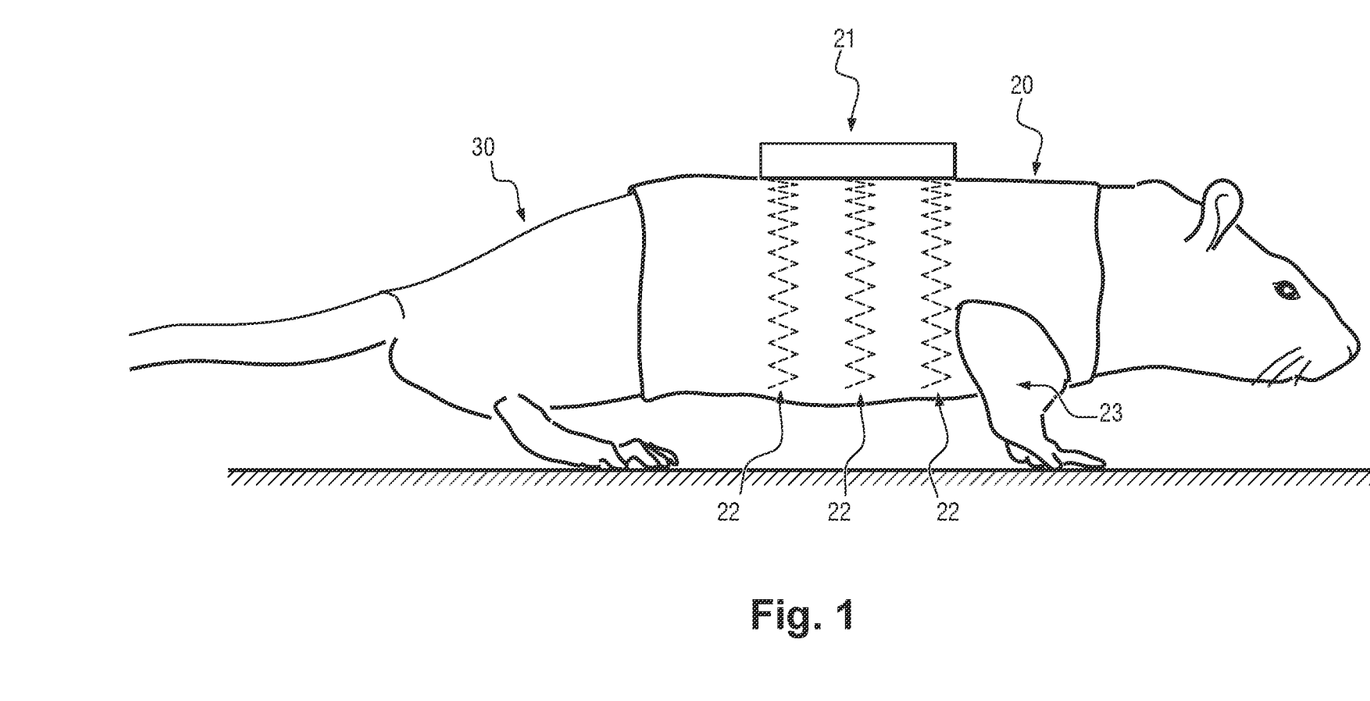
FIG. 1 illustrates a schematic view of a rat wearing the jacket.

FIG. 1 illustrates an embodiment of such a jacket worn by a rat.

The jacket may comprise two or more inductive windings 22, arranged at different spots of the thorax and/or the abdomen of the animal. Each end of the windings 22 is connected to an acquisition device which makes it possible to record the signal of variation in section of each winding 22.

The jacket advantageously comprises a pocket 21 located on the back of the animal and containing the acquisition device and connectors connecting the ends of the windings to the acquisition device. The pocket allows protecting and carry the acquisition device and the connectors.

Moreover, the jacket preferentially comprises two orifices 23 suitable for the passage of the front paws of the mammal. Each orifice 23 has an elongated shape along the circumference of the tube. The orifices 23 are arranged symmetrically with respect to a vertical plane passing through the animal's spine.

Device for Putting the Jacket on a Mammal

For small mammals, i.e. for mammals of which the mass varies between 20 g and 3 kg, preferably lagomorphs, a device for putting the jacket on the mammal's trunk is provided.

The device comprises a tube extending along an axis X between an inlet and an outlet. This tube comprises a hollow conical part extending around the axis X. The tube also comprises a hollow cylindrical part extending around the axis X. The conical and cylindrical parts, that are integral with each other, together form the tube. The conical part tapers from the inlet to the cylindrical part and the cylindrical part leads from the conical part to the outlet. The cylindrical part has an outer surface adapted to receive the jacket.

The tube presents a slit running longitudinally through the tube, through both the conical part and the cylindrical part.

Moreover, the device comprises a base. This base comprises a flat support surface. The flat support surface is parallel to the axis X of the tube.

The tube is configured to allow passage of the mammal through the tube. The passageway formed within the tube extends from inlet to outlet so that the mammal 30 engages the jacket as it exits the tube.

Figure 2:
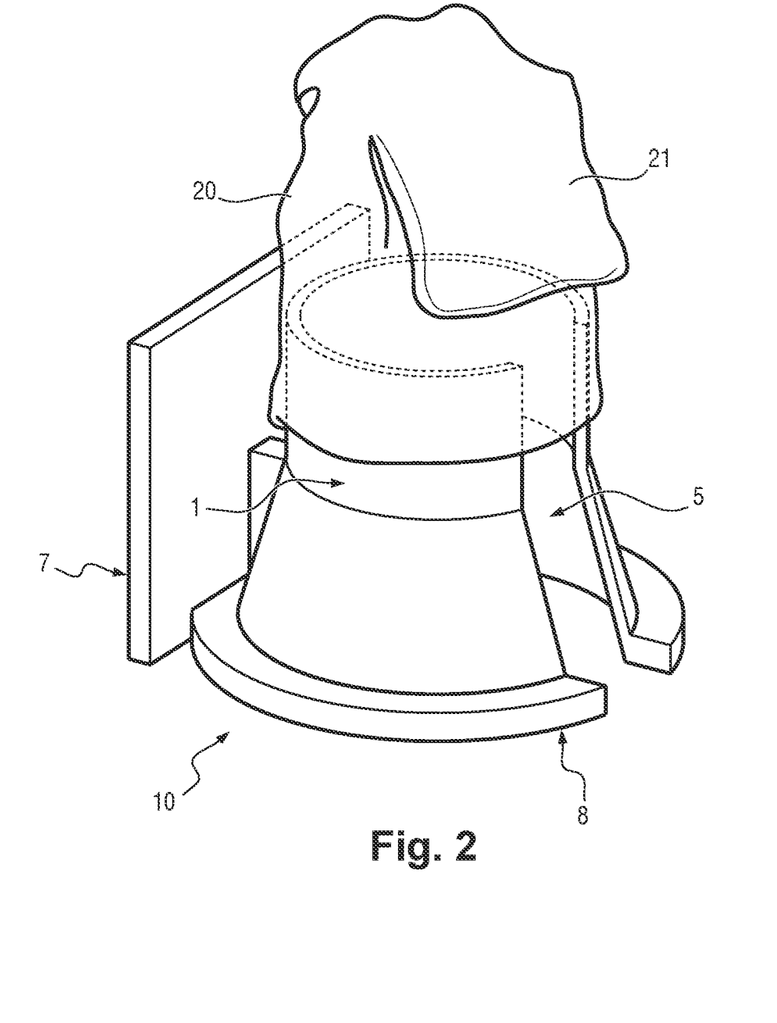
FIG. 2 illustrates a kit formed of the device and the jacket in vertical position.
Figure 3:
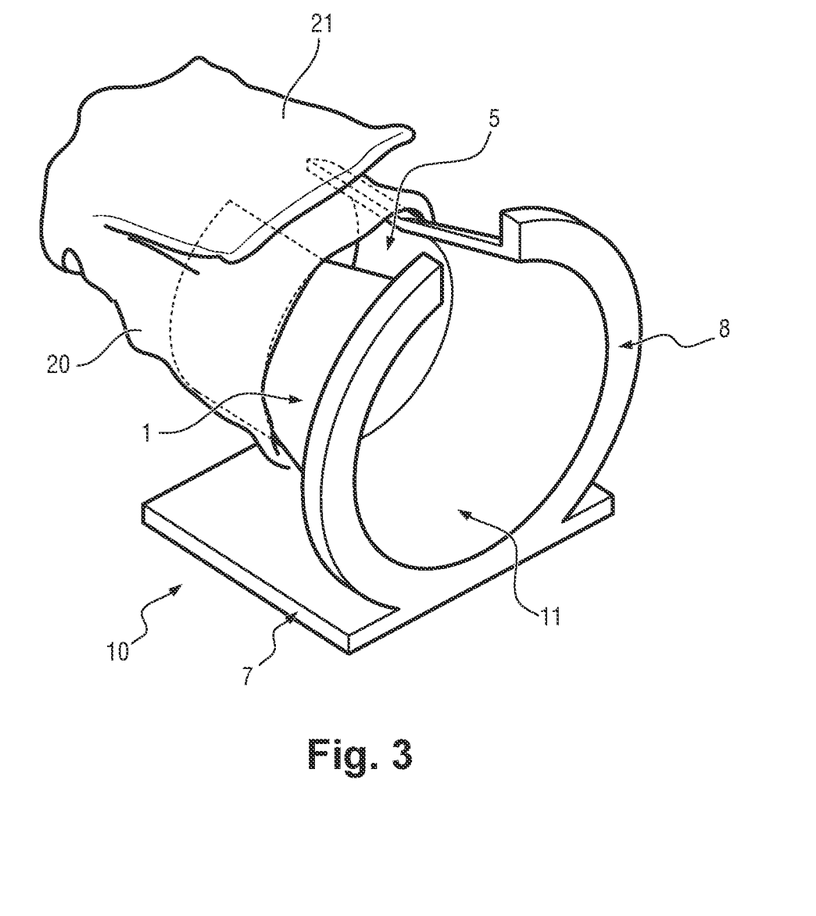
FIG. 3 illustrates the kit of FIG. 2 in horizontal position, ready for use.
Figure 4:
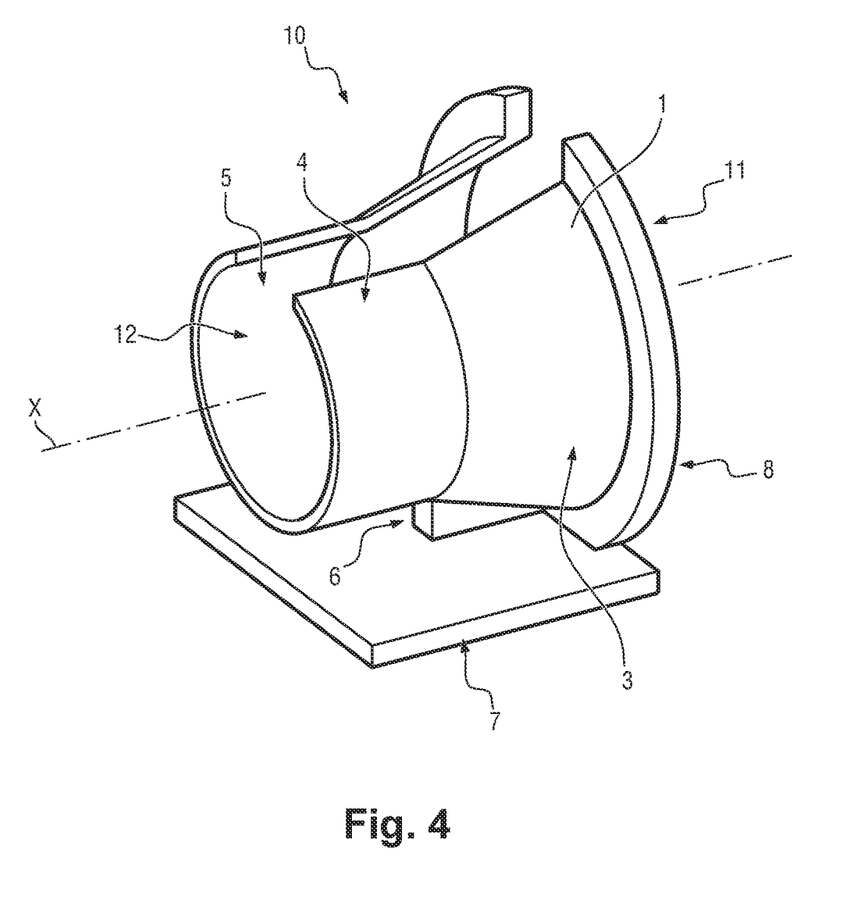
FIG. 4 illustrates the device without the jacket.

As shown in FIGS. 2-4, the hollow conical part 3 is a truncated cone of revolution which provides a double function. Firstly, its tapered shape favors the entry of the mammal 30 into the tube 1 and its guidance to the outlet 12. Secondly it indicates to the user where the inlet 11 and the outlet 12 are. The hollow cylindrical part 4 allows to canalize the mammal toward the outlet of the tube. The jacket 20 being placed on the device 10 on the hollow cylindrical part 4, this canalization leads the mammal 30 to put the jacket 20 around its trunk. The slit 5 is intended to bring flexibility to the device 10. This flexibility advantageously facilitates the passage of the animal (via a temporary enlargement) and the insertion of the jacket 20 around the tube 1 (via a temporary narrowing of the diameter). Furthermore the slit 5 serves optionally as a visual indicator for the user to place the jacket 20 in the right position. For example, the slit may coincide with the top of the mammal's back during use of the device. In such case, the user will orient the jacket so that the holes intended to receive the front paws are opposite to the slit and the pocket 21 containing the acquisition device is aligned with the slit.

The device 10 further comprises a base 6, comprising a flat support surface 7 parallel to the X axis. Preferentially, the base allows to place the device 10 in a horizontal position, i.e. the X axis being parallel to a support surface when the device is used to put the jacket 20 on the trunk of the mammal (see FIGS. 3 and 5A-5C).

Advantageously, the base is integral with the tube 1, but it is linked to the tube only by the conical part 3 so as to leave the space around the cylindrical part 4 free for fully inserting the jacket 20 on the cylindrical part 4 of the tube 1.

Preferably, the base 6 is diametrically opposite to the slit 5.

Advantageously, the device 10 also comprises at the end of the conical part 3 a flat and widened surface 8 perpendicular to the X axis. This surface 8 forms a bearing surface allowing the user to place the device 10 in a vertical position, i.e. the X axis being orthogonal to the support surface, when placing the jacket 20 around the cylindrical part 4 (see FIG. 2).

The device 10 is advantageously made of a red material. This is of particular interest because small mammals like rodents do not have visual receptors to see this color, so it is assimilated to black. By instinct, they are attracted to dark places, such as holes, in which they can hide. As a result, this color facilitates their passage in the tube 1. A realization in another color is however possible.

The device 10 can be produced by an additive manufacturing process like 3D printing. In such case, the material used may be a filament in PLA (polylactic acid) of the desired color. Another process such as injection, sintering, or machining would be also possible.

To adapt to the different sizes of small mammals and the corresponding jackets 20, the device 10 may be available in several sizes. The jacket 20 must be well arranged and maintained on the device 10 and a part of the jacket 20 must stay out of the device 10 to allow inserting the animal's paws.

For example, the inner diameter of the inlet may range from 70 to 90 mm and the inner diameter of the outlet may range from 46 to 58 mm.

Dressing Method

The method for putting the jacket 20 on the trunk of the small mammal 30 can be carried out according to the following steps.

Preferentially, the user places the device 10 in vertical position as shown in FIG. 2, the bearing surface 8 located at the end of the conical portion being in contact with a support surface such as a table. The axis X of the tube 1 is thus perpendicular to the support surface. This orientation allows advantageously the user to put the jacket 20 on the cylindrical part 12 using both hands, without needing to hold the tube 1 in one of his hands.

The user advantageously threads the jacket on the cylindrical part 4 until the junction between conical 3 and cylindrical 4 parts. The positioning of the jacket 20 being able to prove fastidious on a cylindrical form, the angles of the slit 5 may help gripping the jacket while putting it on the cylindrical part 12.

Preferentially, the user takes the slit 5 as a visual reference to orient the jacket. In particular, the user positions the jacket to ensure that the holes for the paws are out of the cylindrical part 12 and well oriented to allow the dressing of the mammal.

The jacket may be inserted on the cylindrical part 4 of the tube 1 over a length that is between 10% and 70% of a total length of the jacket 20 and advantageously between 20% and 50% or between 30 and 40% of the total length of the jacket 20, so as not to fall from the device until the mammal has engaged the jacket. Furthermore, the remaining length of the jacket 20 not inserted on the cylindrical part 4 of the tube 1 should be sufficient to make sure the mammal 30 cannot pass to easily through the jacket 20.

After putting the jacket on the tube 1, the user places the device 10 and the jacket 20 horizontally, i.e. the X axis being parallel to the support surface. In this position the base 6 is in contact with the support surface (see FIG. 3).

Figure 5A:
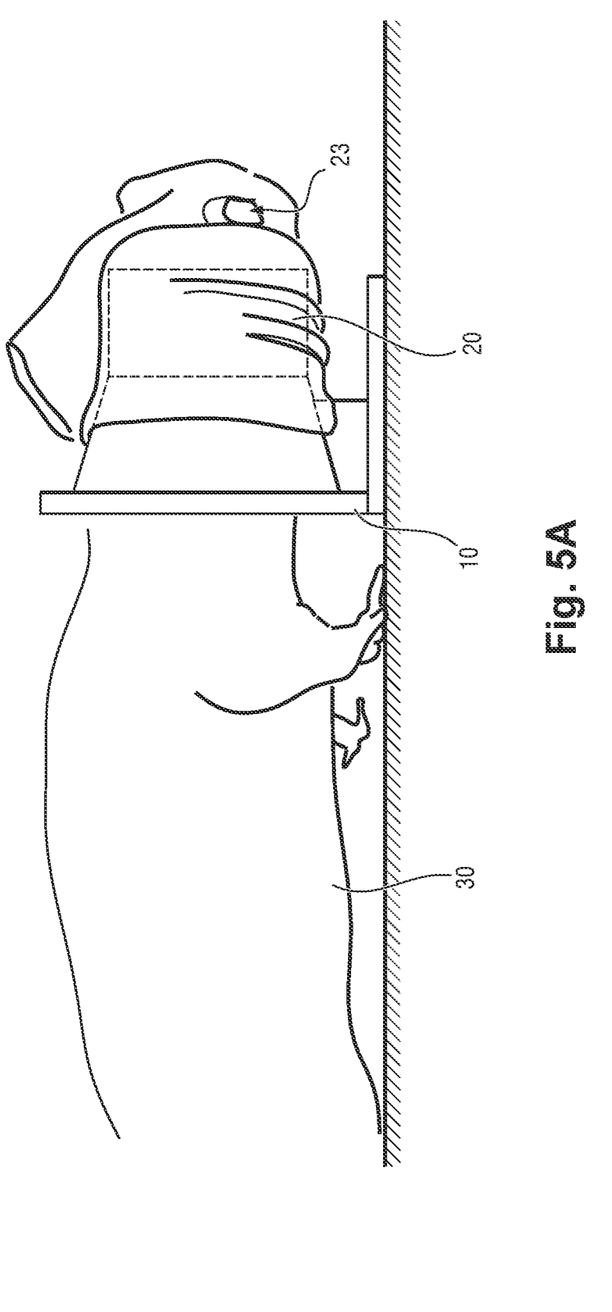
FIGS. 5A to 5C illustrate successive steps of use of the device.
Figure 5B:
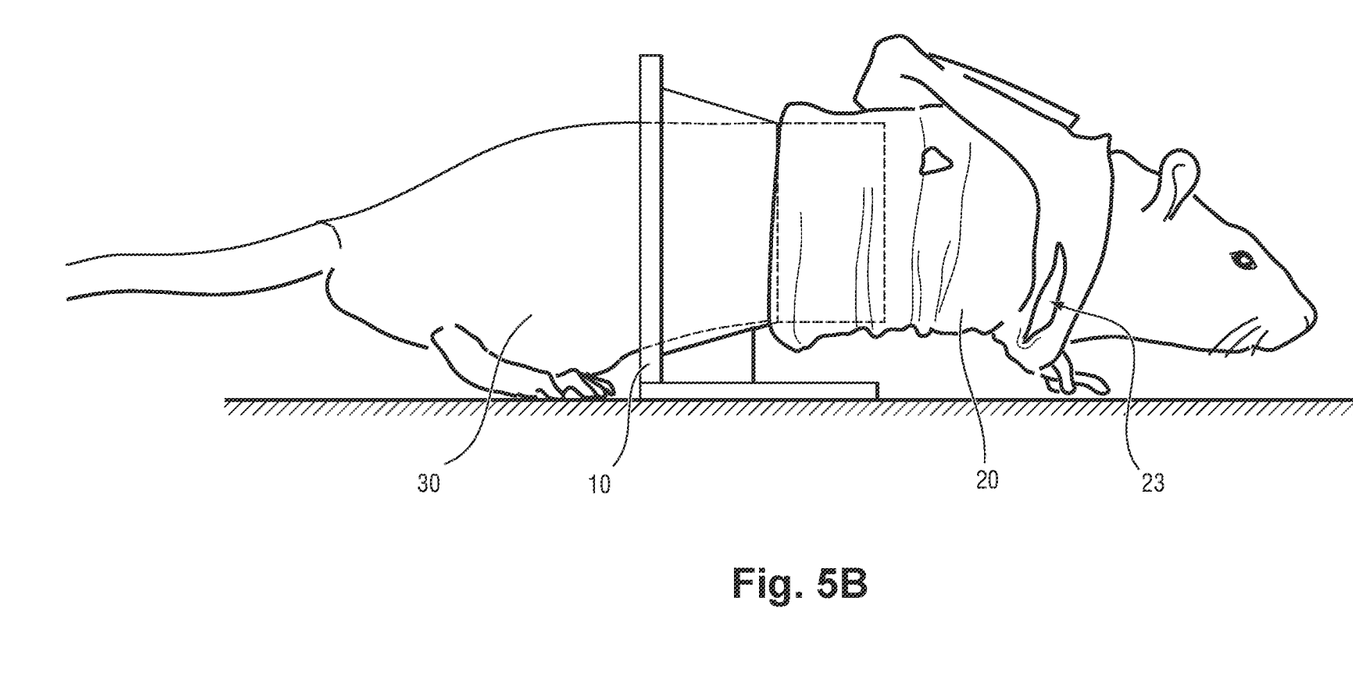
Figure 5C:
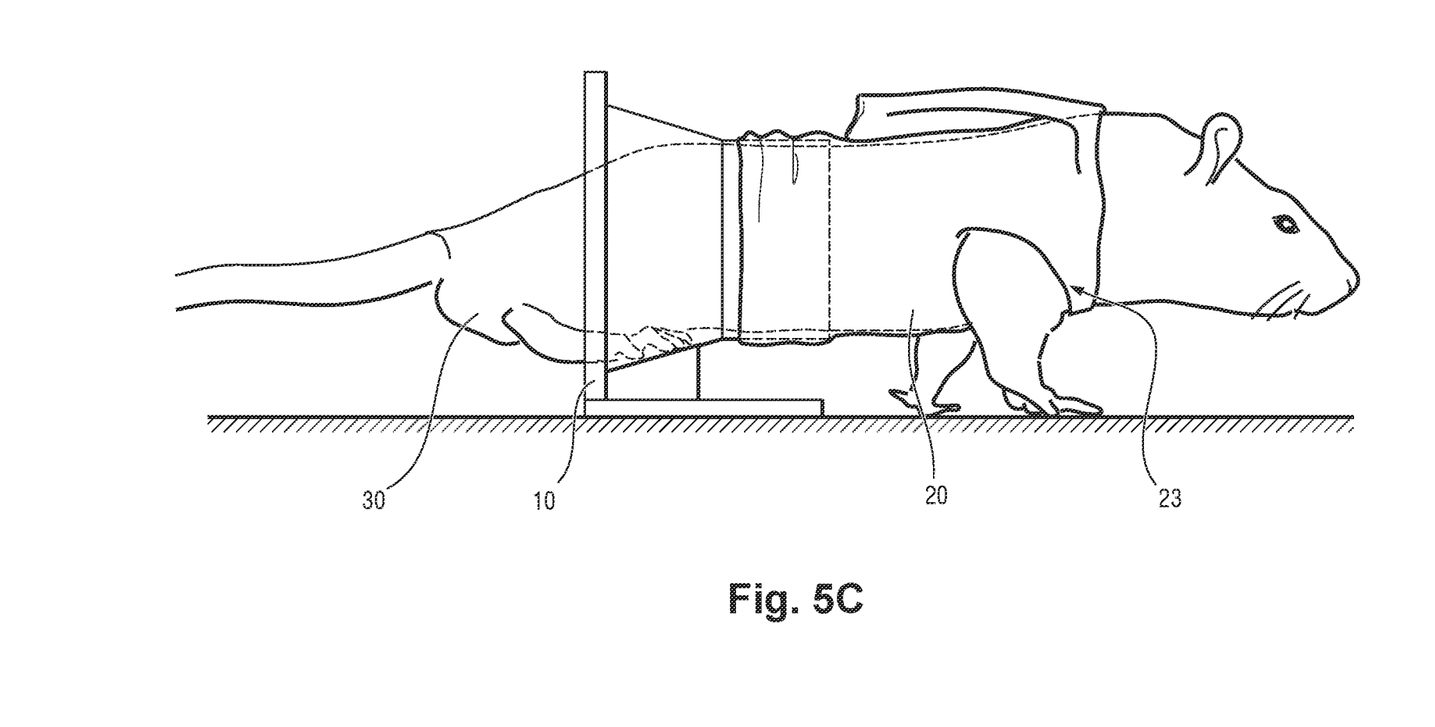

Then the user brings the mammal in front of the inlet of the conical part 3 (see FIG. 5A). The mammal enters in the device 10 through the inlet 11 of the tube 1 (see FIG. 5B) and goes out of the cylindrical part 4 through the outlet 12 of the tube 1. When it goes out of the device 10 through the outlet 12, the mammal has the jacket 20 put on its trunk (see FIG. 5C).

Finally, the user removes the device 10 from the back of the mammal, leaving the jacket on it. Then the user inserts the front paws of the mammal in the holes provided for them.

Optionally, it is possible to carry out this operation having already placed the acquisition device in a pocket intended for this purpose. Alternatively, the acquisition device may be placed in the pocket and connected to the windings after the jacket has been placed onto the animal.

The invention claimed is:

1. A kit comprising a device and a jacket for a mammal of which the mass is less than 3 kg, the device comprising:
    a tube extending along an axis between an inlet and an outlet, the tube comprising:
    a hollow conical part tapering from the inlet, and a hollow cylindrical part contiguous to the conical part and leading to the outlet, the cylindrical part having an outer surface adapted to receive the jacket; and
    a base comprising a flat support surface parallel to the axis of the tube;
    the tube presenting a slit running longitudinally through the tube and the tube being configured to allow passage of the mammal through the tube from the inlet to the outlet so that the mammal engages the jacket when exiting from the tube;
    the jacket being on the device around the cylindrical part of the device.

2. The kit according to claim 1, wherein a length of the jacket inserted on the cylindrical part of the tube is between 20% and 50% of a total length of the jacket.

3. The kit according to claim 1, wherein the jacket comprises a tube made of elastic textile configured to surround the trunk of said mammal and at least one inductive winding formed of a strand of electrically conductive wire arranged in the form of wavelets along the circumference of said tube.

4. The kit according to claim 3, wherein the jacket comprises two orifices suitable for the passage of the front paws of the mammal.

5. The kit according to claim 1, wherein the slit is located opposite the base in relation to the axis of the tube and runs along the tube from the inlet to the outlet.

6. The kit according to claim 1, wherein an end of the conical part defining the inlet extends in a plane perpendicular to the axis of the tube.

7. The kit according to claim 1, wherein the device comprises plastic material.

8. The kit according to claim 1, wherein the device comprises red color.

9. A method for putting a jacket on a mammal using a kit as claimed in claim 1, comprising:
    putting the jacket around the cylindrical part and until the junction between conical and cylindrical parts;
    placing the base of the device on a support surface;
    causing the mammal to enter into the conical part through the inlet of the tube;
    letting the mammal pass along the tube and exit through the outlet of the tube, thereby engaging the jacket.

10. The method according to claim 9, comprising positioning the device vertically, the axis of the tube being then perpendicular to the support surface for putting the jacket on the cylindrical part.

11. The method according to claim 9, comprising inserting the animal's paws into holes provided in the jacket.

* * * * *

UNITED STATES PATENT AND TRADEMARK OFFICE
CERTIFICATE OF CORRECTION

Page 1 of 1

PATENT NO. : 12,171,195 B2
APPLICATION NO. : 17/837717
DATED : December 24, 2024
INVENTOR(S) : Charles Eynard and Timothé Flenet It is certified that error appears in the above-identified patent and that said Letters Patent is hereby corrected as shown below:

On the Title Page

Item (72) Change "Lyons" to --Lyon-- for both inventors

Signed and Sealed this
Twenty-fifth Day of February, 2025

Coke Morgan Stewart
*Acting Director of the United States Patent and Trademark Office*